United States Patent
Xie

(10) Patent No.: US 8,448,758 B2
(45) Date of Patent: May 28, 2013

(54) SUPPLEMENTARY BRAKING THRUST APPARATUS FOR BRAKE AND SUPPLEMENTARY METHOD THEREOF

(76) Inventor: Xingyun Xie, Changsha (CN)

( * ) Notice: Subject to any disclaimer, the term of this patent is extended or adjusted under 35 U.S.C. 154(b) by 346 days.

(21) Appl. No.: 12/808,980

(22) PCT Filed: Dec. 19, 2008

(86) PCT No.: PCT/CN2008/002034
§ 371 (c)(1),
(2), (4) Date: Jun. 17, 2010

(87) PCT Pub. No.: WO2009/089682
PCT Pub. Date: Jul. 23, 2009

(65) Prior Publication Data
US 2010/0259095 A1  Oct. 14, 2010

(30) Foreign Application Priority Data
Dec. 19, 2007  (CN) .......................... 2007 1 0192659

(51) Int. Cl.
*B60L 7/00* (2006.01)
(52) U.S. Cl.
USPC .......................................... 188/161; 188/171
(58) Field of Classification Search
USPC ................. 188/156–159, 161, 164, 171, 186, 188/182, 43
See application file for complete search history.

(56) References Cited

U.S. PATENT DOCUMENTS

| | | | | |
|---|---|---|---|---|
| 960,055 A | * | 5/1910 | Sundh | 188/171 |
| 1,011,200 A | * | 12/1911 | Ihlder | 188/171 |
| 2,436,880 A | * | 3/1948 | Burgett | 188/171 |
| 2,625,451 A | * | 1/1953 | Mahlke | 16/386 |
| 2,642,160 A | * | 6/1953 | Goetz et al. | 188/171 |
| 2,702,101 A | * | 2/1955 | Dewhurst | 188/171 |
| 3,298,473 A | * | 1/1967 | Jensen | 188/171 |
| 3,356,190 A | * | 12/1967 | Prussak | 188/171 |
| 3,830,344 A | * | 8/1974 | Cervenec et al. | 188/171 |
| 5,244,060 A | * | 9/1993 | Tanaka et al. | 187/261 |

FOREIGN PATENT DOCUMENTS

| | | |
|---|---|---|
| CN | 2148069 Y | 12/1993 |
| CN | 2148069 Y | 12/1993 |
| CN | 2168986 Y | 6/1994 |
| CN | 2209667 Y | 10/1995 |
| CN | 2216061 Y | 12/1995 |

(Continued)

OTHER PUBLICATIONS

Office Action of the Australian Patent Office in foreign counterpart patent Application No. 2008347564, dated Jul. 6, 2011.

(Continued)

*Primary Examiner* — Xuan Lan Nguyen
(74) *Attorney, Agent, or Firm* — Kinney & Lange, P.A.

(57) ABSTRACT

Disclosed is a supplementary braking thrust apparatus for a brake, comprising a thruster. A push lever of the thruster acts on a brake unit. The supplementary braking thrust apparatus of the brake further comprises a supplementary braking mechanism, and the supplementary braking mechanism acts on a brake arm to realize supplementary braking. Also, disclosed is a supplementary braking method of a brake, comprising the following steps: applying a braking action to the brake arm using the thruster; and applying a further braking action to the brake arm using the supplementary braking mechanism to obtain supplementary braking of the brake.

5 Claims, 11 Drawing Sheets

FOREIGN PATENT DOCUMENTS

| | | |
|---|---|---|
| CN | 2283052 Y | 6/1998 |
| CN | 2283052 Y | 6/1998 |
| CN | 2937582 Y | 8/2007 |
| JP | 31-000607 B | 1/1931 |
| JP | 44-000439 Y | 1/1944 |
| JP | 49-120080 A | 11/1974 |
| JP | 02-107833 A | 4/1990 |
| JP | 2003343608 A | 12/2003 |

OTHER PUBLICATIONS

Office Action of the Chinese SIPO in foreign counterpart patent Application No. 200880120777.4, dated Aug. 23, 2011.

Office Action of the Eurasian Patent Office, dated Jan. 12, 2012, in corresponding Eurasian Application No. 201070751/31.

Office Action of the Korean Intellectual Property Office dated May 11, 2012, in Application No. 2010-7013295.

International Search Report in corresponding PCT Application No. PCT/CN2008/002034, filed Dec. 19, 2008.

Office Action of the Japanese Patent Office in Application No. 2010-538314, dated Mar. 2, 2012.

* cited by examiner

SUPPLEMENTARY BRAKING THRUST APPARATUS FOR BRAKE AND SUPPLEMENTARY METHOD THEREOF

FIELD OF THE INVENTION

The present invention relates to a brake, and in particular, to an improvement for a thrust device of a normally closed brake, especially of a normally closed shoe brake and a normally closed disk brake. The present invention also relates to a method for supplementary braking of a brake.

BACKGROUND OF THE INVENTION

A brake is mainly composed of a brake unit and a thruster or a thrust device. A "Variable-Force Thruster For Brake" is disclosed in patent publication No. CN2937582 (the application number is 200620050535.0) published on Aug. 22, 2007, in which the thruster is hinge-connected with a drive arm in the brake unit via a push lever of the thruster to act on the brake unit, so that the brake unit is brought into an operating state. The thruster comprises a drive device, a liquid pump driven by the drive device, a liquid accumulator, and a hydraulic cylinder. The inlet of the liquid pump is communicated with the liquid accumulator, the outlet of the liquid pump is communicated with the drive liquid cavity of the hydraulic cylinder, and the non-drive liquid cavity of the hydraulic cylinder is communicated with the liquid accumulator. In a case of being applied to a normally closed braking, the push lever of the thruster extends out to a predetermined position to release braking in the normally closed state; and when the push lever is retracted, i.e., restoring the normally closed braking of the brake unit, the thruster only enables the brake unit to generate one-time braking of restoring the normally-closed state during the operation of braking.

SUMMARY OF THE INVENTION

According to an aspect of the present invention, there is provided a supplementary braking thrust apparatus for a brake. For the normally closed brake, with the supplementary braking thrust apparatus according to this invention, the normally closed brake not only can be individually reset to be in normally closed braking, but, as required, can create the supplementary braking again after being reset to be in normally closed braking, i.e., create a further braking. The operation of releasing and restoring the normally closed braking can be individually applied to a working condition in which braking is frequently needed, while the operation of exerting both the normally closed braking and the supplementary braking can be applied to a case where more stable and reliable braking is needed, such as a case where the object to be braked does not need to be braked frequently or is in a pausing or stopping state, to enhance stability of braking for the objected to be braked in a static state.

This invention is described with reference to FIG. 1. The supplementary braking thrust apparatus comprises a thruster. A push lever of the thruster acts on a brake arm in a brake unit. Improvement is that the supplementary braking thrust apparatus of the brake further comprises a supplementary braking mechanism which acts on the brake arm to realize supplementary braking. The supplementary braking mechanism according to this invention may be in various forms.

Referring to FIG. 1, for example, the operation of the supplementary braking thrust apparatus is as follows: By individually operating the thruster, the normally closed braking of the brake unit can be released and restored brake unit; when the supplementary braking is needed, by individually operating the supplementary braking mechanism, the two brake arms in the brake unit retract inwardly again or tend to retracting inwardly to realize a further supplementary braking.

This invention is also directed to a supplementary braking method of a brake. The brake comprises a brake arm, a thruster, and a supplementary braking mechanism. The method comprises the following steps: applying a braking action to the brake arm using the thruster; and applying a further braking action to the brake arm using the supplementary braking mechanism to obtain supplementary braking of the brake.

Compared with the prior art, the following advantages of this invention can be realized.

1. Since in this invention the supplementary braking mechanism is properly combined with the thruster to act on the brake arm of the brake unit via corresponding members, the object to be braked can be supplementarily braked after the brake is restored to be in normally closed braking state, so that not only the brake can meet a braking requirement in a normal working state, but also the supplementary braking can make braking of the object to be braked more reliable.

2. Since the thruster and the supplementary braking mechanism in this invention can perform braking through separate operations, respectively, the thruster can be operated to perform frequent braking in a working condition in which braking is frequently needed. In the meantime, the supplementary braking mechanism can be further separately operated to perform supplementary braking if more stable and reliable braking is needed. Especially in a case where the object to be braked does not need to be braked frequently or is in a pausing or stopping state, both the normally closed braking and the supplementary braking are performed to enhance stability of braking for the objected to be braked in a static state. In this way, possible damages to the object to be braked due to, for example, strong wind can be effectively prevented, so that the object to be braked can be protected very well.

3. Since this invention employs the supplementary braking mechanism based on the prior art and the object to be braked can be further supplementarily braked after being normally-closed braked, braking functions and effects of two normally closed brakes can be realized by one normally closed brake of the invention. When a multiple-stage supplementary braking mechanism is provided, the object to be braked can be supplementarily braked for multiple times, so that braking functions and effects of multiple normally closed brakes can be achieved by one normally closed brake of the invention.

4. Since the normally closed brake according to this invention can provide the braking functions and effects of two or more normally closed brakes, manufacturing material can be saved, manufacturing and utilizing cost can be reduced, energy consumption can be reduced, and space required for mounting two or more brakes can be reduced, compared with two or more brakes.

Next, this invention is further explained in combination with the drawings and specific embodiments.

DETAILED DESCRIPTION OF THE PREFERRED EMBODIMENTS

Next, the supplementary braking thrust apparatus for the brake according to this invention is described with reference to the drawings. The supplementary braking thrust apparatus for the brake comprises a thruster. A push lever of the thruster acts on a brake arm in a brake unit. The supplementary braking thruster apparatus of the brake further comprises a supplementary braking mechanism which acts on the brake arm to obtain supplementary braking. Preferably, the brake is a normally closed brake. Hereinafter, the present invention is explained based on the normally closed brake, however this invention is not limited thereto.

Alternatively, the supplementary braking mechanism comprises a supplementary braking rod and a supplementary braking member. When the supplementary braking member releases energy stored therein, the supplementary braking rod exerts a force on the brake arm to realize supplementary braking. Preferably, the supplementary braking rod is a telescopic thrust rod which exerts a force on the brake arm to realize supplementary braking when the supplementary braking member releases energy. Alternatively, the supplementary braking rod is conjured to be a drive lever pivotally rotatable about a fixed point, so that when the supplementary braking member releases energy, the drive lever exerts a force on the brake arm to realize supplementary braking.

It should be noted that the supplementary braking member may be any device for supplying energy to drive the supplementary braking rod, such as a motor.

Next, embodiments of the supplementary braking thrust apparatus for the brake are described with reference to the drawings.

Figure 1:
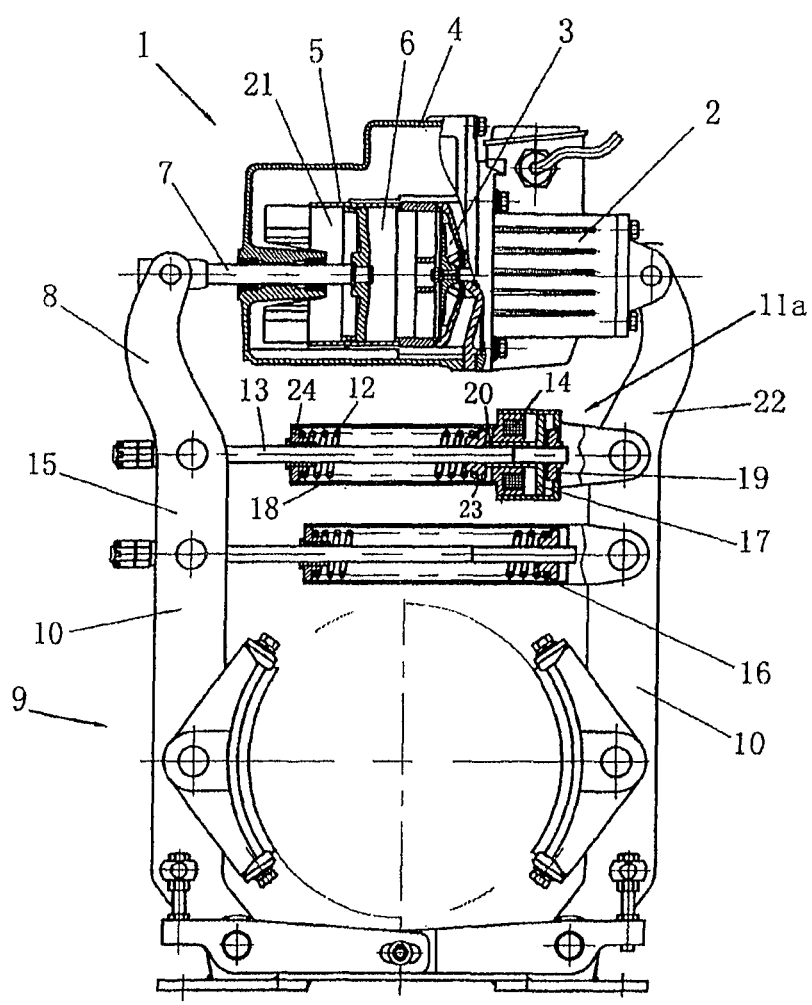
FIG. 1 is a schematic view of the first implementing structure according to this invention, showing the brake unit of the brake and the thruster and the first supplementary braking mechanism according to this invention.

The first implementing structure of the present invention is shown in FIG. 1. The supplementary braking thrust apparatus according to this embodiment comprises a thruster 1. An outer end of a push lever 7 of the thruster 1 is hinge-connected with a drive arm 8 in a brake unit to act on a brake arm 10 in the brake unit 9. A supplementary braking mechanism for enabling the brake unit to realize the supplementary braking is provided. The supplementary braking mechanism acts on the brake arm 10 in the brake unit 9 by means of corresponding members.

The thruster 1 comprises a drive device 2, a liquid pump 3 driven by the drive device, a liquid accumulator 4, and a hydraulic cylinder 5. The inlet of the liquid pump 3 is communicated with the liquid accumulator 4. The outlet of the liquid pump 3 is communicated with a drive liquid cavity 6 of the hydraulic cylinder. A non-drive liquid cavity 21 of the hydraulic cylinder is communicated with the liquid accumulator 4. A piston lever of the hydraulic cylinder, i.e., the push lever 7, is hinge-connected with the drive arm 8 and acts on the brake arm 10 in the brake unit 9 via the drive arm 8. The liquid accumulator 4 is provided therein with an air cavity to remove a vacuum state in the liquid accumulator, thereby facilitating flow of a liquid media during the operation of the thruster.

Figure 2:
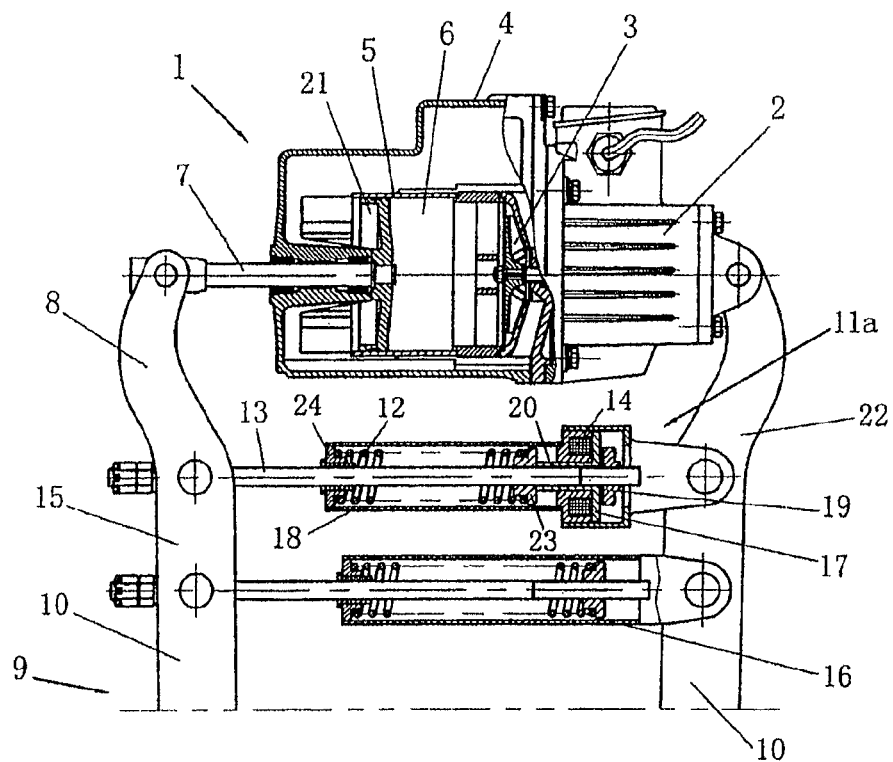
FIG. 2 shows an operating state of the structure shown in FIG. 1, in which the normally closed braking of the brake unit and the supplementary braking of this invention are released and the object to be braked is in operating state.

As shown in FIG. 2, a supplementary braking mechanism 11a is provided, and the supplementary braking mechanism 11a comprises a supplementary braking member 12, a thrust rod 13, and a sleeve 18. An inner end of the thrust rod 13 and the supplementary braking member 12 are provided within the sleeve 18. An outer end of the thrust rod 13 is hinge-connected with a thrust arm 15, that is, the thrust rod 13 is hinge-connected with the thrust arm 15 via the outer end of the thrust rod 13, to act on the brake arm 10 in the brake unit 9. The supplementary braking mechanism 11a further comprises an electromagnetic device 14 for storing/releasing energy to/from the supplementary braking member 12. The electromagnetic device 14 comprises an electromagnetic coil and an attraction block 17. The electromagnetic coil of the electromagnetic device 14 is connected with the sleeve 18.

The supplementary braking member 12 is a spring member. The inner end of the thrust rod 13 passes through the spring-type supplementary braking member 12 and the electromagnetic device 14. The thrust rod 13 is provided on the inner end thereof with a slide block 23 slidable along the thrust rod 13. The spring-type supplementary braking member 12 is provided between an end cover 24 of the sleeve 18 and the slide block 23 with the two ends thereof acting on the sleeve 18 and the slide block 23, respectively. The thrust rod 13 is provided at an inner end thereof with a limit block 19 for the attraction block 17. The attraction block 17 of the electromagnetic device is located between the electromagnetic coil and the limit block 19 and cooperates with the electromagnetic coil. The limit block 19 is connected with the thrust rod 13 by means of screw thread connection. The force parameter of the spring-type supplementary braking member 12 can be adjusted by adjusting the relative position of the limit block 19 with respect to the thrust rod 13. A tube sleeve 20 is extended from the attraction block 17. The spring-type supplementary braking member 12 acts on the attraction block 17 via the slide block 23 and the tube sleeve 20.

Figure 3:
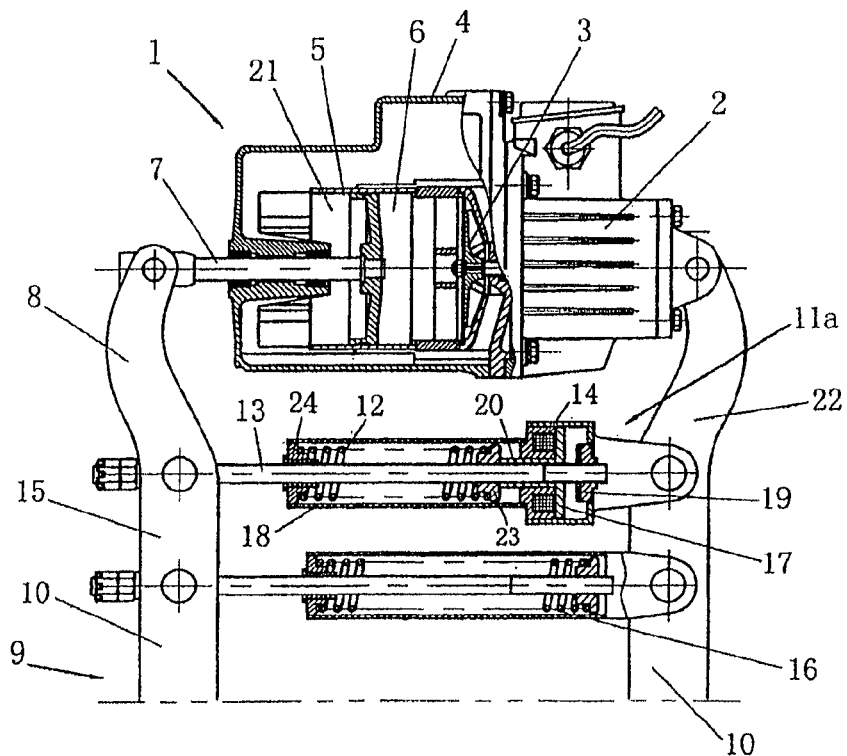
FIG. 3 shows another operating state of the structure shown in FIG. 1, in which the brake unit is already reset to be in a normally closed braking state and the supplementary braking of this invention is not performed.

When implementing this invention, the drive arm 8 hinge-connected with the push lever 7 and the thrust arm 15 hinge-connected with the thrust rod 13 can be formed in various forms. As shown in FIGS. 1-3, the thrust arm 15 and the drive arm 8 overlap each other, i.e., the lower segment of the drive arm 8 is the thrust arm 15.

In the structure shown in FIGS. 1-3, the right end (i.e., the connection end) of the thruster 1 and the right end (i.e., the connection end) of the sleeve 18 in the supplementary braking mechanism 11a are hinge-connected with an extension arm 22 of the other brake arm 10 in the brake unit, so that the two brake arms 10 can be opened outwardly or retracted inwardly, simultaneously. That is, the thruster 1 and the sleeve 18 in the supplementary braking mechanism 11a have connection ends connected with the extension arm 22 of the other brake arm 10 in the brake unit. Such a connection structure is called as an upright structure.

Since the supplementary braking mechanism is provided therein with the electromagnetic device 14, and control of the supplementary braking is realized by shutting off a power supply, it is beneficial to synchronization of the supplementary braking in a case where several brakes provided with the supplementary braking mechanism are used to brake the same object to be braked.

The shown brake unit is in a shoe structure. This invention also can be used in a normally closed disk brake.

The operation of the supplementary braking device shown in FIG. 1 is described as follows. The drive device 2 is operated to drive the liquid pump 3. The pressured liquid enters into the drive liquid cavity 6 of the hydraulic cylinder 5. The piston lever (i.e., the push lever) 7 extends out to the predetermined position (as shown in FIG. 2) and acts on the brake arm 10 in the brake unit 9 via the drive arm 8. Thus, the thrust rod 13 of the supplementary braking mechanism 11a extends out, and the attraction block 17 contacts with the electromagnetic coil. That is, the two brake arms 10 are outwardly opened against the brake force of a brake mechanism 16 in the brake unit and the supplementary braking force of the supplementary braking mechanism 11a and are retained to be positioned, i.e., the supplementary braking and the normally closed braking of the brake are released. At this time, the object to be braked is in an operating state. When braking is needed, the power supply of the drive device is shut off, the operation of the liquid pump 3 is stopped, and the liquid in the drive liquid cavity 6 of the hydraulic cylinder is in a non-pressured state. In this way, the push lever 7 is retracted to be reset (as shown in FIG. 3) due to the brake force of the normally closed braking mechanism, i.e. the spring 16, of the brake, and the brake arm 10 is retracted inwardly. Then, the thrust rod 13 creates a first retraction. At the same time, the liquid in the drive liquid cavity of the hydraulic cylinder flows back to the liquid accumulator 4 via the liquid pump, and the brake is reset into normally closed braking. The operation of releasing and recovering the normally closed braking can be separately applied to a working condition in which braking is frequently needed. After the brake is reset to be in normally closed braking, the electromagnetic device 14 is energized, and the attraction block 17 is in an attraction state. The tube sleeve 20 passing through the attraction block 17 and the slide block 23 act on the spring-type supplementary braking member 12, so that the spring-type supplementary braking member 12 is retained in an energy storing state. When supplementary braking is needed, the power supply of the electromagnetic device 14 is shut off. The spring-type supplementary braking member 12 releases energy, so that the slide block 23 and the attraction block 17 are moved to the right along the thrust rod 13, and the attraction block 17 then contacts with the limit block 19 at the end of the thrust rod 13 and is limited by the limit block 19, as shown in FIG. 1. When the attraction block 17 is moved to the right along the thrust rod 13 to contact with the limit block 19, the energy released from the supplementary braking member 12 acts on the limit block 19, so that the limit block 19 is moved to the right (the direction indicated in the figures). Then, the limit block 19 pulls the thrust rod 13 to retract into the sleeve 18 again. The thrust rod 13 pulls the thrust arm 15, and the thrust arm 15 then acts on the brake arm 10, so that the brake arm 10 retracts inwardly or tends to retracting inwardly. In this way, the supplementary braking of the object to be braked is obtained, that is, both the normally closed braking and the supplementary braking are performed. The operation of both the normally closed braking and the supplementary braking being performed can be used in a condition where more stable and reliable braking is needed, such as a condition where the object to be braked does not need to be braked frequently or is in a pausing or stopping state, to enhance stability of braking for the objected to be braked in a static state.

Figure 4:
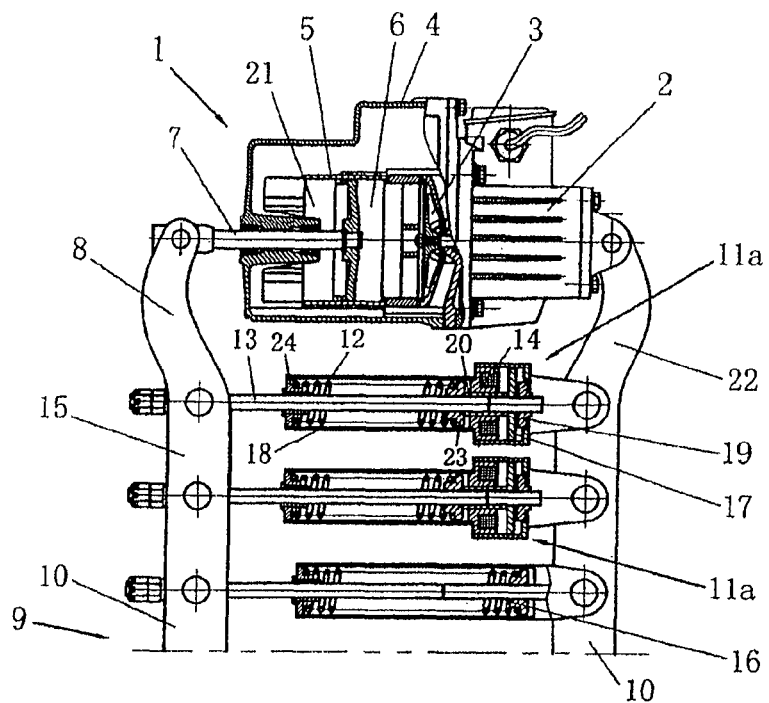
FIG. 4 is a modification of the structure shown in FIG. 1 which is provided with two-stage first supplementary braking mechanism.

FIG. 4 shows two-stage supplementary braking mechanism 11a which is formed by adding an additional supplementary braking mechanism based on the supplementary braking mechanism shown in FIG. 1. The structure of the additional supplementary braking mechanism 11a is same as that of the supplementary braking mechanism 11a shown in FIG. 1, that is, the object to be brake can be supplementarily braked twice.

Figure 5:
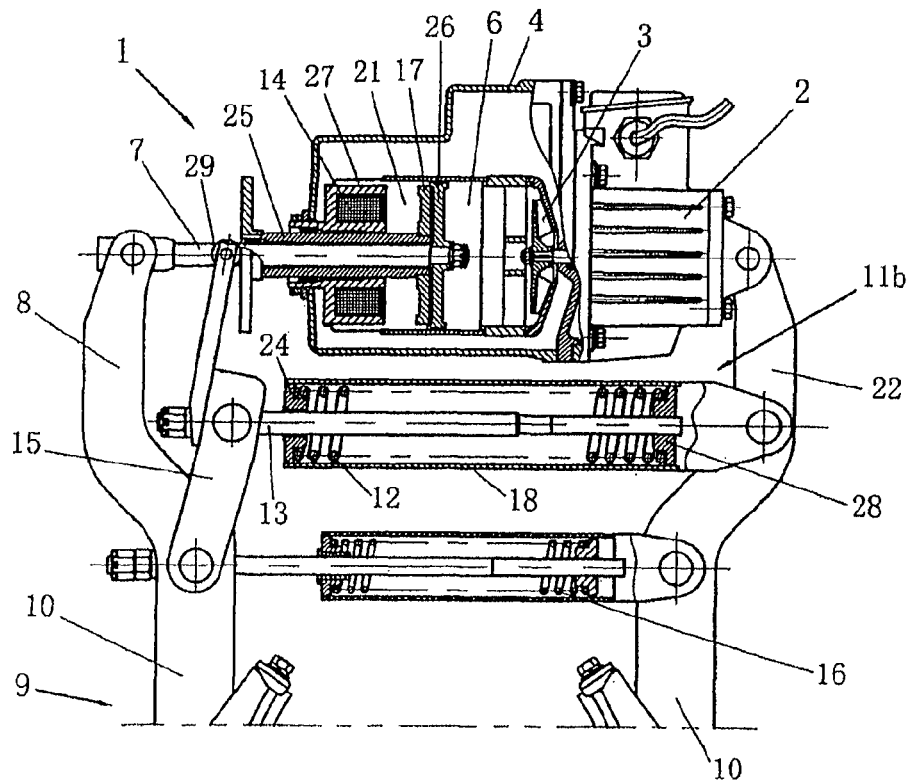
FIG. 5 is a schematic view of the second modified structure according to this invention, in which the electromagnetic device in the first supplementary braking mechanism is provided in the thruster.

FIG. 5 shows a second modification of the present invention. As shown in FIG. 5, the supplementary braking thrust apparatus comprises a thruster 1. The thruster 1 comprises a drive device 2, a liquid pump 3 driven by the drive device 2, a liquid accumulator 4, and a hydraulic cylinder 5. The inlet of the liquid pump 3 is communicated with the liquid accumulator 4. The outlet of the liquid pump 3 is communicated with a drive liquid cavity 6 of the hydraulic cylinder. A non-drive liquid cavity 21 of the hydraulic cylinder is communicated with the liquid accumulator 4. A piston lever of the hydraulic cylinder, i.e., the push lever 7, is hinge-connected with the drive arm 8 and acts on the brake arm 10 in the brake unit 9 via the drive arm 8. A supplementary braking mechanism for enabling the brake unit 9 to realize the supplementary braking is provided.

A tube sleeve 25 is provided around the push lever 7 of the thruster 1. The outer end of the tube sleeve 25 is located outside the liquid accumulator 4. The inner end of the tube sleeve 25 is located within the non-drive liquid cavity 21 of the hydraulic cylinder 5. When the push lever 7 extends outwardly, the tube sleeve 25 follows the push lever 7 to extend outwardly; and when the push lever 7 retracts inwardly, a relative slide between the push lever 7 and the tube sleeve 25 occurs.

The supplementary braking mechanism is the supplementary braking mechanism 11b. The supplementary braking mechanism 11b comprises a supplementary braking member 12, a thrust rod 13, and a sleeve 18. An inner end of the thrust rod 13 and the supplementary braking member 12 are provided within the sleeve 18. The supplementary braking member 12 is a spring member. The inner end of the thrust rod 13 passes through the spring-type supplementary braking member 12. A block 28 is connected to the inner end of the thrust rod 13. The spring-type supplementary braking member 12 is disposed between an end cover 24 of the sleeve 18 and the block 28 with the two ends thereof acting on the sleeve 18 and the block 28, respectively. The block 28 is connected with the thrust rod 13 by means of screw thread connection. The force parameter of the spring-type supplementary braking member 12 can be adjusted by adjusting the relative position of the block 28 with respect to the thrust rod 13. The outer end of the thrust rod 13 is hinge-connected with the thrust arm 15 to act on the brake arm 10 in the brake unit 9. The other end of the thrust arm 15 contacts with the outer end of the tube sleeve 25 and acts on the tube sleeve 25, as shown in the figure. The end of the thrust arm 15 contacting with the outer end of the tube sleeve 25 is provided with a roller 29, that is, the thrust arm 15 contacts with the outer end of the tube sleeve 25 via the roller 29 on the end of the thrust arm 15 to reduce friction generated due to relative displacement when the end of the thrust arm 15 contacts with the tube sleeve 25.

The supplementary braking mechanism 11b further comprises an electromagnetic device 14 for storing/releasing energy to/from the supplementary braking member 12. The electromagnetic device 14 is provided within the thruster 1. The electromagnetic device 14 comprises an electromagnetic coil and an attraction block 17. The electromagnetic coil is connected to the wall of the liquid accumulator 4 or is connected to the cylinder wall of the hydraulic cylinder 5 via a member 27. The attraction block 17 is located between the electromagnetic coil and a piston ring 26 and cooperates with the electromagnetic coil. Further, the attraction block 17 is connected to the tube sleeve 25 and follows the movement of tube sleeve 25 to be moved.

In the implementing structure shown in FIG. 5, the thrust arm 15 and the drive arm 8 do not overlap each other and are provided separately. The right end (i.e., the connection end) of the thruster 1 and the right end (i.e., the connection end) of the sleeve 18 in the supplementary braking mechanism 11b are hinge-connected with an extension arm 22 of the other brake arm 10 in the brake unit 9. That is, the thruster 1 and the sleeve 18 in the supplementary braking mechanism 11b have connection ends connected with the extension arm 22 of the other brake arm 10 in the brake unit 9. Such a connection structure is called an upright structure.

The operation of the supplementary braking device 11b shown in FIG. 5 is described as follows. The drive device 2 is operated to drive the liquid pump 3. The pressured liquid enters into the drive liquid cavity 6 of the hydraulic cylinder 5. The piston lever (i.e., the push lever) 7 extends out to a predetermined position and causes the tube sleeve 25 to extend out. Thus, the attraction block 17 contacts with the electromagnetic coil, and the thrust rod 13 of the supplementary braking mechanism 11b also extends out. The two brake arms 10 are opened against the brake force of a brake mechanism 16 in the brake unit and the supplementary braking force of the supplementary braking mechanism 11b and are retained to be positioned, i.e., both the supplementary braking and the normally closed braking of the brake are released. At this time, the object to be braked is in an operating state. When braking is needed, the power supply of the drive device 2 is shut off, the operation of the liquid pump 3 is stopped, and the liquid in the drive liquid cavity 6 of the hydraulic cylinder is in a non-pressured state. In this way, the push lever 7 is retracted to be reset due to the brake force of the normally closed braking mechanism 16 of the brake, and the two brake arms 10 create a first inward retraction. At the same time, the liquid in the drive liquid cavity of the hydraulic cylinder flows back to the liquid accumulator 4 via the liquid pump, and the brake is reset into normally closed braking. At this time, as the electromagnetic device 14 is energized, the attraction block 17 of the electromagnetic device 14 in the thruster 1 is still attracted and is retained to be positioned, and the tube sleeve 25 and the thrust rod 13 are still in an extending-out state, so that the supplementary braking member 12 is still in an energy-storing non-braking state. When supplementary braking is needed, the power supply of the electromagnetic device 14 is shut off, the attraction force of the attraction block 17 is removed, and the spring-type supplementary braking member 12 releases energy, so that the thrust rod 13 retracts and the braking force of the supplementary braking member 12 acts on the thrust arm 15. Thus, the thrust arm 15 is rotated downwardly along the clockwise direction. An end of the thrust arm 15 forces the tube sleeve 25 to retract inwardly to be reset, and the tube sleeve 25 pulls the attraction block 17 to move away from the coil of the electromagnetic device 14, as shown in FIG. 5. The other end of the thrust arm 15 acts on the brake arm 10, so that the two brake arms 10 retract inwardly or tends to retracting inwardly. In this way, the supplementary braking is obtained.

Figure 6:
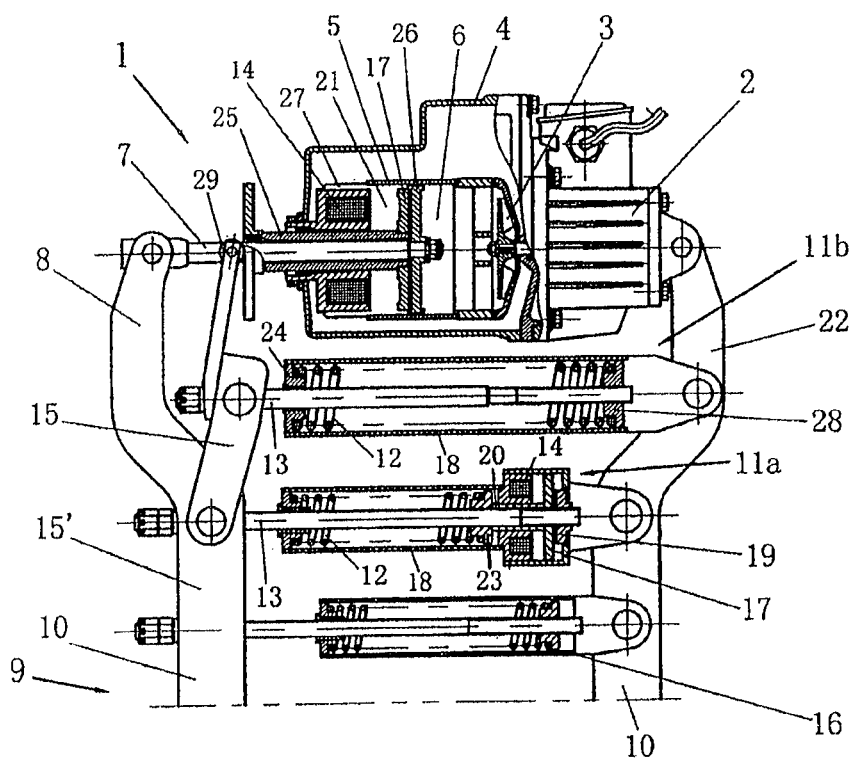
FIG. 6 is a modification of the structure shown in FIG. 5, in which an additional first supplementary braking mechanism is provided in addition to the second supplementary braking mechanism.

FIG. 6 is a modification of the structure shown in FIG. 5, in which a supplementary braking mechanism 11a is added on a basis of the provision of the supplementary braking mechanism 11b.

The supplementary braking mechanism 11a comprises a supplementary braking member 12, a thrust rod 13, and a sleeve 18. An inner end of the thrust rod 13 and the supplementary braking member 12 are provided within the sleeve 18. The thrust rod 13 acts on the brake arm 10 in the brake unit 9 via the outer end of the thrust rod 13 and a thrust arm 15', as shown in the figure. The thrust arm 15' and the drive arm 8 overlap each other, i.e., the lower segment of the drive arm 8 is the thrust arm 15'. The supplementary braking mechanism 11a further comprises an electromagnetic device 14 for storing/releasing energy to/from the supplementary braking member 12. The electromagnetic device 14 comprises an electromagnetic coil and an attraction block 17. The electromagnetic coil of the electromagnetic device 14 is connected with the sleeve 18. The supplementary braking member 12 is a spring member. The inner end of the thrust rod 13 passes through the spring-type supplementary braking member 12 and the electromagnetic device 14. The thrust rod 13 is provided on the inner end thereof with a slide block 23 slidable along the thrust rod 13. The spring-type supplementary braking member 12 is provided between an end cover 24 of the sleeve 18 and the slide block 23 with the two ends thereof acting on the sleeve 18 and the slide block 23, respectively. The thrust rod 13 is provided at an inner end thereof with a limit block 19 for the attraction block 17. The attraction block 17 of the electromagnetic device is located between the electromagnetic coil and the limit block 19 and cooperates with the electromagnetic coil. The limit block 19 is connected with the thrust rod 13 by means of screw thread connection. The force parameter of the spring-type supplementary braking member 12 can be adjusted by adjusting the relative position of the limit block 19 with respect to the thrust rod 13. A tube sleeve 20 extends from the attraction block 17. The spring-type supplementary braking member 12 acts on the attraction block 17 via the slide block 23 and the tube sleeve 20. After the supplementary braking mechanism 11b performs the first supplementary braking, the supplementary braking mechanism 11a performs the further supplementary braking and the operation thereof is same as described above.

The right end (i.e., the connection end) of the sleeve 18 in the supplementary braking mechanism 11a is hinge-connected with an extension arm 22 of the other brake arm 10 in the brake unit, that is, the sleeve 18 in the supplementary braking mechanism 11a has a connection end connected with the extension arm 22 of the other brake arm 10 in the brake unit.

Figure 7:
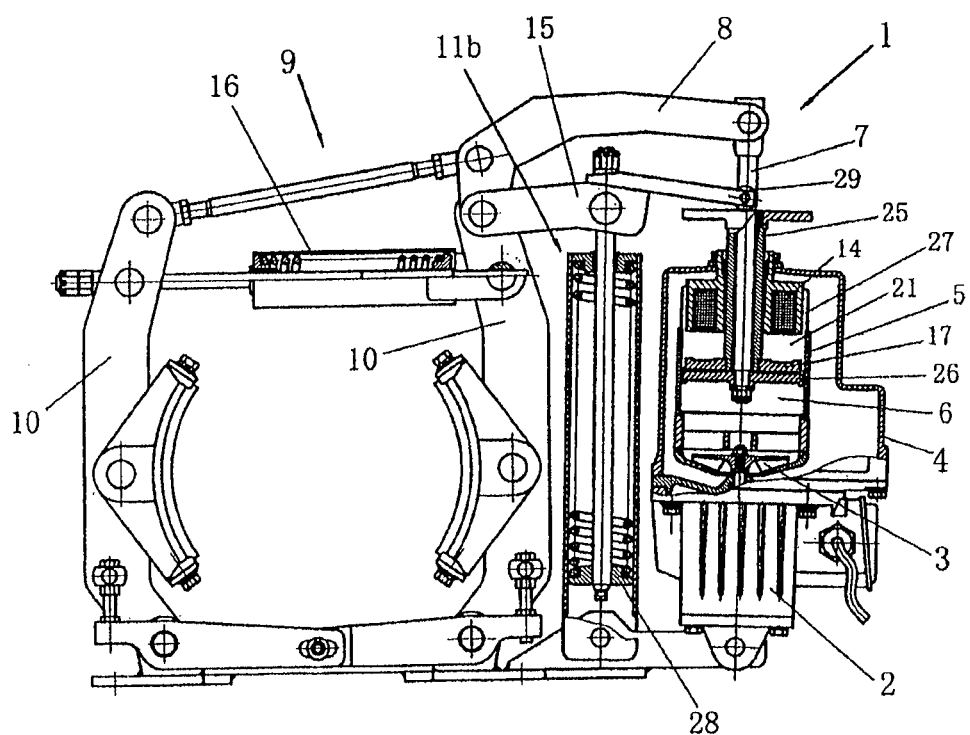
FIG. 7 is a schematic view of the third modified structure according to this invention, in which the upright structure shown in FIG. 5 is changed into a horizontal structure.
Figure 8:
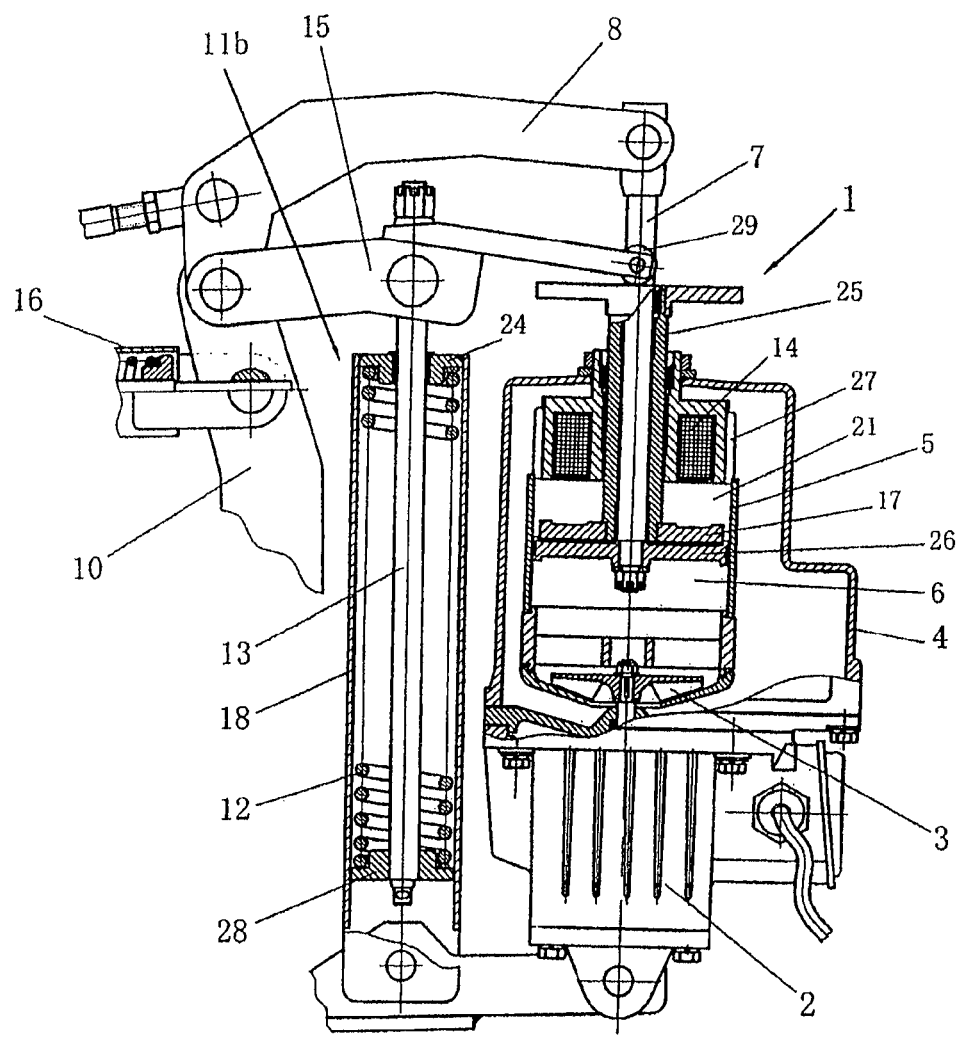
FIG. 8 is an enlarged view of the supplementary braking thrust apparatus in FIG. 7.
Figure 9:
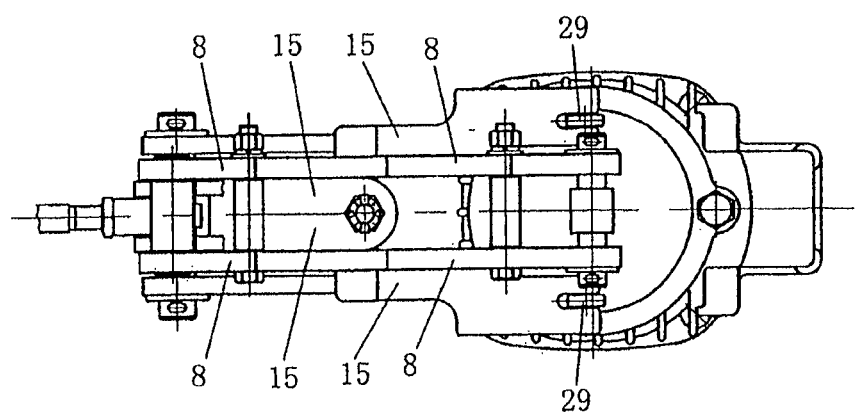
FIG. 9 is a top view of the structure shown in FIG. 8.

FIG. 7 shows a third modification of the present invention, also being regarded as a modification for the structure shown in FIG. 5, in which the upright structure is changed into a horizontal structure. FIG. 8 is an enlarged view of the supplementary braking thrust apparatus, and FIG. 9 is a top view of FIG. 8.

As shown in the figures, this implementing embodiment comprises a thruster 1. The thruster comprises a drive device 2, a liquid pump 3 driven by the drive device, a liquid accumulator 4, and a hydraulic cylinder 5. The inlet of the liquid pump 3 is communicated with the liquid accumulator 4. The outlet of the liquid pump 3 is communicated with a drive liquid cavity 6 of the hydraulic cylinder. A non-drive liquid cavity 21 of the hydraulic cylinder is communicated with the liquid accumulator 4. A piston lever of the hydraulic cylinder, i.e., the push lever 7, is hinge-connected with the drive arm 8 and acts on the brake arm 10 in the brake unit 9 via the drive arm 8. A supplementary braking mechanism for enabling the brake unit 9 to realize the supplementary braking is provided.

A tube sleeve 25 is provided around the push lever 7 of the thruster 1. The outer end of the tube sleeve 25 is located outside the liquid accumulator 4. The inner end of the tube sleeve 25 is located within the non-drive liquid cavity 21 of the hydraulic cylinder 5. When the push lever 7 extends outwardly, the tube sleeve 25 follows the movement of the push lever 7 to extend outwardly; and when the push lever 7 retracts inwardly, a relative slide between the push lever 7 and the tube sleeve 25 occurs.

The supplementary braking mechanism is configured to be the supplementary braking mechanism 11b. The supplementary braking mechanism 11b comprises a supplementary braking member 12, a thrust rod 13, and a sleeve 18. An inner end of the thrust rod 13 and the supplementary braking member 12 are provided within the sleeve 18. The supplementary braking member 12 is a spring member. The inner end of the thrust rod 13 passes through the spring-type supplementary braking member 12. A block 28 is connected to the inner end of the thrust rod 13. The spring-type supplementary braking member 12 is disposed between an end cover 24 of the sleeve 18 and the block 28 with the two ends thereof acting on the sleeve 18 and the block 28, respectively. The block 28 is connected with the thrust rod 13 by means of screw thread connection. The force parameter of the spring-type supplementary braking member 12 can be adjusted by adjusting the relative position of the block 28 with respect to the thrust rod 13. The outer end of the thrust rod 13 is hinge-connected with the middle portion of the thrust arm 15. An end of the thrust arm 15 is hinge-connected with the brake arm 10. The thrust rod 13 acts on the brake arm 10 in the brake unit 9 via the thrust arm 15. The other end of the thrust arm 15 contacts with the outer end of the tube sleeve 25 and acts on the tube sleeve 25, as shown in the figures. The end of the thrust arm 15 contacting with the outer end of the tube sleeve 25 is provided with a roller 29, that is, the thrust arm 15 contacts with the outer end of the tube sleeve 25 via the roller 29 on the end of the thrust arm 15 to reduce friction generated due to relative displacement when the end of the thrust arm 15 contacts with the tube sleeve 25.

The supplementary braking mechanism 11b further comprises an electromagnetic device 14 for storing/releasing energy to/from the supplementary braking member 12. The electromagnetic device 14 is provided within the thruster 1. The electromagnetic device 14 comprises an electromagnetic coil and an attraction block 17. The electromagnetic coil is connected to the wall of the liquid accumulator 4 or is connected to the cylinder wall of the hydraulic cylinder 5 via a member 27. The attraction block 17 is located between the electromagnetic coil and a piston ring 26 and cooperates with the electromagnetic coil. Further, the attraction block 17 is connected to the tube sleeve 25 and follows the movement of tube sleeve 25 to be moved.

In the implementing structure shown in FIG. 7, the thrust arm 15 and the drive arm 8 do not overlap each other and are provided separately. The connection end (i.e., the lower end) of the thruster 1 and the connection end (i.e., the lower end) of the sleeve 18 in the supplementary braking mechanism 11b are connected with a base frame or other fixation members. That is, the thruster 1 and the sleeve 18 in the supplementary braking mechanism 11b have connection ends connected with the base frame or the other fixation members. Such a connection structure is a horizontal structure.

The operation of the supplementary braking mechanism 11b shown in FIGS. 7-9 is same as that of the supplementary braking mechanism 11b shown in FIG. 5.

Figure 10:
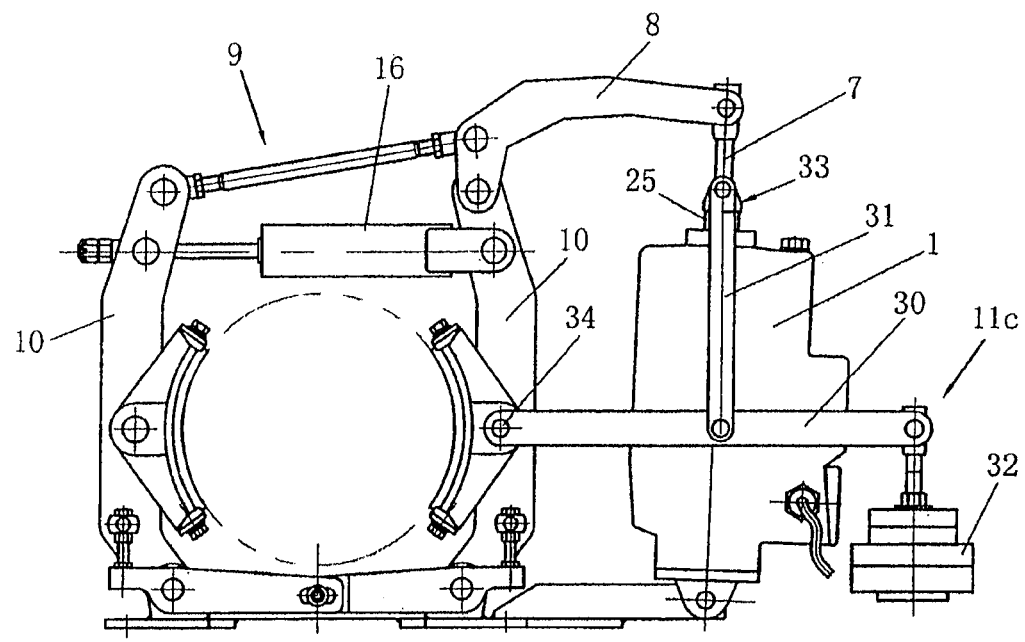
FIG. 10 is a schematic view of the fourth modified structure according to this invention, also regarded as a modification of the structure shown in FIG. 7, in which the supplementary braking mechanism is modified into a lever-type horizontal structure.
Figure 11:
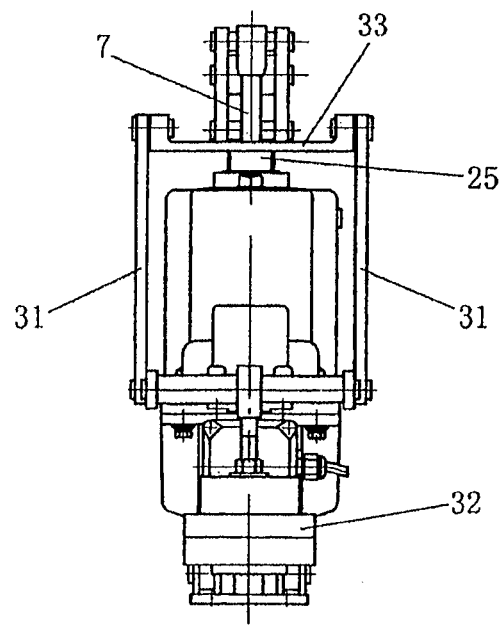
FIG. 11 is a right view of the structure shown in FIG. 10.

FIG. 10 is a fourth modification of the present invention, also being regarded as a modification for the structure shown in FIG. 7, in which the supplementary braking mechanism is modified to be in a lever-type structure (the lever-type supplementary braking mechanism is numbered as 11c in this invention). FIG. 11 is a right view of FIG. 10. In order to explicitly describe the structure of the lever-type supplementary braking mechanism 11c, the thruster 1 in FIG. 10 is not shown as in a cutaway view. The cutaway structure of the thruster 1 of this implementing structure is same as that of the thruster 1 shown in FIG. 8 and is explained with reference to the structure of the thruster of FIG. 8.

The implementing structure comprises a thruster 1. The thruster comprises a drive device 2, a liquid pump 3 driven by the drive device, a liquid accumulator 4, and a hydraulic cylinder 5. The inlet of the liquid pump 3 is communicated with the liquid accumulator 4. The outlet of the liquid pump 3 is communicated with a drive liquid cavity 6 of the hydraulic cylinder. A non-drive liquid cavity 21 of the hydraulic cylinder is communicated with the liquid accumulator 4. A piston lever of the hydraulic cylinder, i.e., the push lever 7, is hinge-connected with the drive arm 8 and acts on the brake arm 10 in the brake unit 9 via the drive arm 8. A supplementary braking mechanism for enabling the brake unit to realize the supplementary braking is provided.

A tube sleeve 25 is provided around the push lever 7 of the thruster 1. The outer end of the tube sleeve 25 is located outside the liquid accumulator 4. The inner end of the tube sleeve 25 is located within the non-drive liquid cavity 21 of the hydraulic cylinder 5. When the push lever 7 extends outwardly, the tube sleeve 25 follows the push lever 7 to extend outwardly; and when the push lever 7 retracts inwardly, a relative slide between the push lever 7 and the tube sleeve 25 occurs.

The supplementary braking mechanism is a lever-type supplementary braking mechanism 11c. The lever-type supplementary braking mechanism 11c comprises a pair of drive levers 30 and a pair of pull levers 31. The pair of drive levers 30 and the pair of pull levers 31 are provided symmetrically with respect to each other. An end of the drive lever 30 is connected with the brake arm 10 of the brake unit 9, and the other end of drive lever 30 is provided with a supplementary braking member, i.e., a weight block 32. The lower ends of the pair of pull levers 31 are hinge-connected with the middle portions of the two drive levers 30, respectively. The upper ends of the pair of pull lever 31 are connected to the two ends of a connection lever 33, respectively, as shown in FIG. 11. The middle portion of the connection lever 33 contacts with the upper end of the tube sleeve 25.

The lever-type supplementary braking mechanism 11c further comprises an electromagnetic device 14 for storing/releasing energy to/from the supplementary braking member, i.e., the weight block 30. The electromagnetic device 14 is provided within the thruster 1, as shown in FIG. 8. The electromagnetic device 14 comprises an electromagnetic coil and an attraction block 17. The electromagnetic coil is connected to the cylinder wall of the hydraulic cylinder 5 or is connected to the wall of the liquid accumulator 4 via other members. The attraction block 17 is located between the electromagnetic coil and a piston ring 26 and cooperates with the electromagnetic coil. Further, the attraction block 17 is connected to the tube sleeve 25 and follows the movement of the tube sleeve 25 to be moved.

The connection end (i.e., the lower end) of the thruster 1 of this implementing structure is connected with a base frame or other fixation members. That is, the thruster 1 has a connection end connected with the base frame or the other fixation members. Such a connection structure is a horizontal structure.

It should be noted that the supplementary braking member herein is not limited to the weight block 32. For instance, the supplementary braking member may be an extension spring with one end thereof being fixedly connected to the drive lever and the other end thereof being fixedly connected to the outer wall of the hydraulic cylinder. Of course, this invention is not limited thereto, either.

The operation of the lever-type supplementary braking mechanism 11c is described as follows. The drive device 2 is operated to drive the liquid pump 3. The pressured liquid enters into the drive liquid cavity 6 of the hydraulic cylinder 5. The piston lever (i.e., the push lever) 7 extends out to a predetermined position and causes the tube sleeve 25 to extend out. Thus, the connection lever 33 is displaced upwardly and then drives the pull lever 31 to be displaced upwardly. Then, the pull lever 31 drives the drive lever 30 to be rotated upwardly along the anticlockwise direction about a hinge shaft 34. The weight block 32 is lifted to be in an energy-storing state. At the same time, the two brake arms 10 of the brake unit 9 are opened outwardly, i.e., the normally closed braking of the brake unit and the braking of the lever-type supplementary braking mechanism are released. The object to be braked is operated. When braking is needed, the power supply of the drive device is firstly shut off, and the operation of the liquid pump 4 is stopped. The push lever 8 falls to a predetermined position, and the brake unit is in a normally closed braking state again. The operation of the object to be brake is stopped. At this time, as the electromagnetic device 14 is energized, the attraction block 17 is still attracted by the electromagnetic force of the electromagnetic coil, so that the tube sleeve 25 is still in an extending-out state and thus the lifted weight block 30 is still in an energy-storing state. When the power supply of the electromagnetic device is shut off, the attraction force is removed, and the weight block 32 falls due to gravity, so that the tube sleeve 25 along with the attraction block 17 falls and the two brake arms 10 of the brake unit retract inwardly or tend to retracting inwardly. In this way, the supplementary braking for the object to be braked is obtained, and the braking state of the object to be braked is more stable and reliable.

Figure 12:
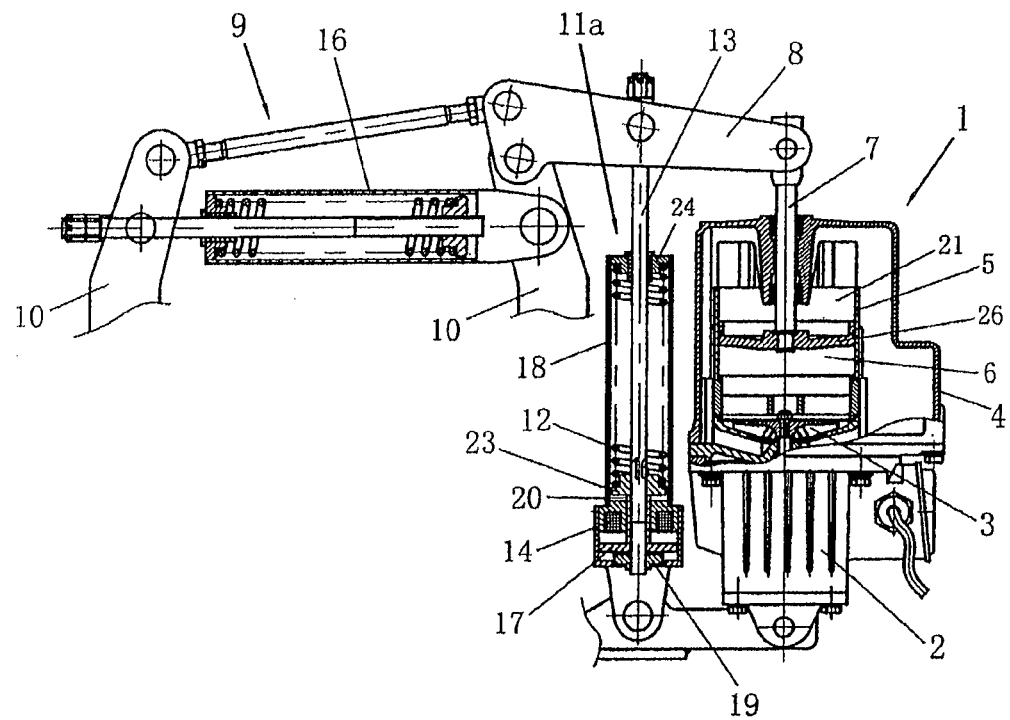
FIG. 12 is a schematic view of the fifth modified structure according to this invention, in which the upright structure shown in FIG. 1 is modified into a horizontal structure and the first supplementary braking mechanism is provided outside the brake unit.

FIG. 12 shows the fifth modification of the present invention, in which the upright structure shown in FIG. 1 is modified into a horizontal structure, and the supplementary braking mechanism 11a is provided outside of the brake unit 9.

This implementing structure comprises a thruster 1. The thruster comprises a drive device 2, a liquid pump 3 driven by the drive device, a liquid accumulator 4, and a hydraulic cylinder 5. The inlet of the liquid pump 3 is communicated with the liquid accumulator 4. The outlet of the liquid pump 3 is communicated with a drive liquid cavity 6 of the hydraulic cylinder 5. A non-drive liquid cavity 21 of the hydraulic cylinder 5 is communicated with the liquid accumulator 4. A piston lever of the hydraulic cylinder, i.e., the push lever 7, is hinge-connected with the drive arm 8 and acts on the brake arm 10 in the brake unit 9 via the drive arm 8. A supplementary braking mechanism for enabling the brake unit 9 to realize the supplementary braking is provided.

The supplementary braking mechanism is configured to be the supplementary braking mechanism 11a. The supplementary braking mechanism 11a comprises a supplementary braking member 12, a thrust rod 13, and a sleeve 18. An inner end of the thrust rod 13 and the supplementary braking member 12 are provided within the sleeve 18. The outer end of the thrust rod 13 is hinge-connected with the drive arm 8 to act on the brake arm 10 in the brake unit 9. As shown in FIG. 12, the outer end of the thrust rod 13 is hinge-connected with the middle portion of the drive arm 8, i.e., the supplementary braking member 12 is located at an inner side the thruster 1. The outer end of the thrust rod 13 may be hinge-connected with an extension arm (not shown), extending in the right direction, of the drive arm 8, that is, the supplementary braking member 12 is located at the right side of the thruster 1. The supplementary braking mechanism 11a further comprises an electromagnetic device 14 for storing/releasing energy to/from the supplementary braking member 12. The electromagnetic device 14 comprises an electromagnetic coil and an attraction block 17. The electromagnetic coil of the electromagnetic device 14 is connected with the sleeve 18. The supplementary braking member 12 is a spring member. The inner end of the thrust rod 13 passes through the spring-type supplementary braking member 12 and the electromagnetic device 14. The thrust rod 13 is provided on the inner end thereof with a slide block 23 slidable along the thrust rod 13. The spring-type supplementary braking member 12 is provided between an end cover 24 of the sleeve 18 and the slide block 23 with the two ends thereof acting on the sleeve 18 and the slide block 23, respectively. The thrust rod 13 is provided at an inner end thereof with a limit block 19 for the attraction block 17. The attraction block 17 of the electromagnetic device is located between the electromagnetic coil and the limit block 19 and cooperates with the electromagnetic coil. The limit block 19 is connected with the thrust rod 13 by means of screw thread connection. The force parameter of the spring-type supplementary braking member 12 can be adjusted by adjusting the relative position of the limit block 19 with respect to the thrust rod 13. A tube sleeve 20 extends from the attraction block 17. The spring-type supplementary braking member 12 acts on the attraction block 17 via the slide block 23 and the tube sleeve 20.

In the implementing structure shown in FIG. 12, the connection end (i.e., the lower end) of the thruster 1 and the connection end (i.e., the lower end) of the sleeve 18 in the supplementary braking mechanism 11a are connected with a base frame or other fixation members. That is, the thruster 1 and the sleeve 18 in the supplementary braking mechanism 11a have connection ends connected with the base frame or the other fixation members. Such a connection structure is a horizontal structure.

The operation of the supplementary braking device 11a shown in FIG. 12 is described as follows. The drive device 2 is operated to drive the liquid pump 3. The pressured liquid enters into the drive liquid cavity 6 of the hydraulic cylinder 5. The piston lever (i.e., the push lever) 7 extends out to a predetermined position and acts on the brake arm 10 in the brake unit 9 via the drive arm 8. Thus, the thrust rod 13 of the supplementary braking mechanism 11a extends out, and the attraction block 17 then contacts with the electromagnetic coil. That is, the two brake arms 10 are outwardly opened against the brake force of a brake mechanism 16 in the brake unit and the supplementary braking force of the supplementary braking mechanism 11a and are retained to be positioned, i.e., the supplementary braking and the normally closed braking of the brake are released. At this time, the object to be braked is in an operating state. When braking is needed, the power supply of the drive device is shut off, the operation of the liquid pump 3 is stopped, and the liquid in the drive liquid cavity 6 of the hydraulic cylinder is in a non-pressured state. At this time, due to the brake force of the normally closed braking mechanism 16 of the brake, the thrust rod 13 creates a first retraction. By the action of the drive arm 8, the push lever 7 retracts to be reset, and the brake arm 10 retracts inwardly. At the same time, the liquid in the drive liquid cavity of the hydraulic cylinder flows back to the liquid accumulator 4 via the liquid pump, and the brake is reset into normally closed braking. After the brake is reset to be in normally closed braking, as the electromagnetic device 14 is energized, and the attraction block 17 still is in an attraction state. The tube sleeve 20 passing through the attraction block 17 and the slide block 23 act on the spring-type supplementary braking member 12, so that the spring-type supplementary braking member 12 is retained in an energy storing state. When supplementary braking is needed, the power supply of the electromagnetic device 14 is shut off. The spring-type supplementary braking member 12 releases energy, so that the slide block 23 and the attraction block 17 are moved downwardly along the thrust rod 13, and the attraction block 17 then contacts with the limit block 19 at the end of the thrust rod 13 and is limited by the limit block 19. When the attraction block 17 is moved downwardly along the thrust rod 13 to contact with the limit block 19, the energy released from the supplementary braking member 12 acts on the limit block 19, so that the limit block 19 is moved downwardly. Then, the limit block 19 pulls the thrust rod 13 to retract into the sleeve 18 again. The thrust rod 13 pulls the drive arm 8 downwardly, and the drive arm 8 acts on the brake arm 10 again, so that the brake arm 10 retracts inwardly or tends to retracting inwardly. In this way, the supplementary braking of the object to be braked is obtained.

Figure 13:
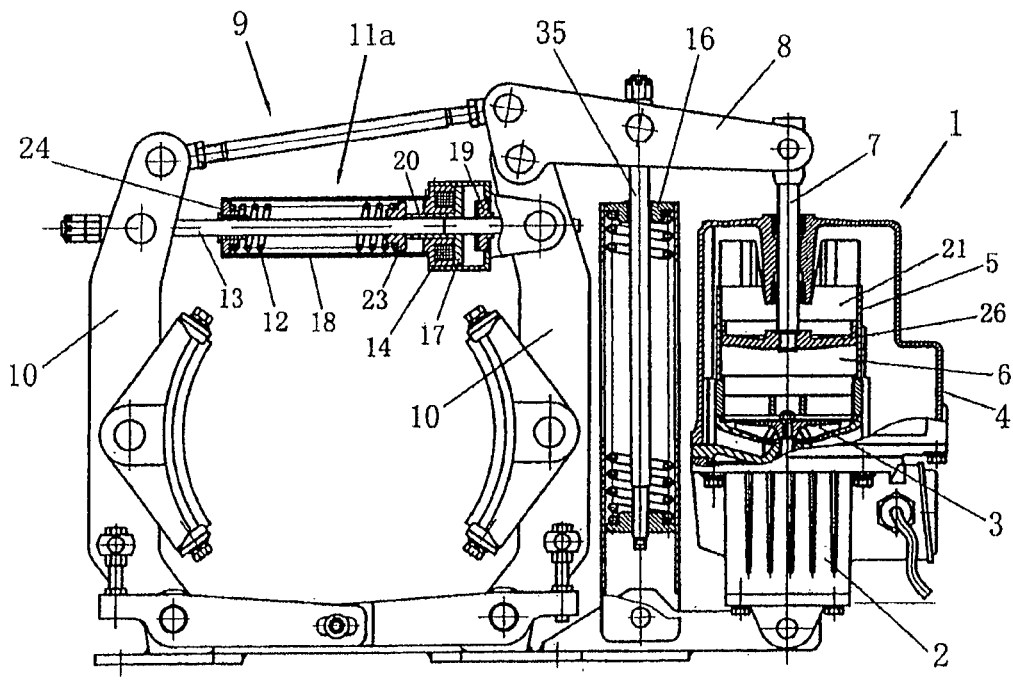
FIG. 13 is a schematic view of the sixth modified structure according to this invention, in which the upright structure shown in FIG. 1 is modified into a horizontal structure and the brake mechanism of the brake unit is provided outside the brake arm.

FIG. 13 shows a sixth modification of the present invention, in which the upright structure shown in FIG. 1 is modified into a horizontal structure, the supplementary braking mechanism 11a is provided in the brake unit 9, and the brake mechanism 16 of the brake unit is provided outside of the brake arm 10.

This implementing structure comprises a thruster 1. The thruster comprises a drive device 2, a liquid pump 3 driven by the drive device, a liquid accumulator 4, and a hydraulic cylinder 5. The inlet of the liquid pump 3 is communicated with the liquid accumulator 4. The outlet of the liquid pump 3 is communicated with a drive liquid cavity 6 of the hydraulic cylinder 5. A non-drive liquid cavity 21 of the hydraulic cylinder 5 is communicated with the liquid accumulator 4. A piston lever of the hydraulic cylinder, i.e., the push lever 7, is hinge-connected with the drive arm 8 and acts on the brake arm 10 in the brake unit 9 via the drive arm 8. A supplementary braking mechanism for enabling the brake unit to realize the supplementary braking is provided.

The supplementary braking mechanism is configured to be the supplementary braking mechanism 11a. The supplementary braking mechanism 11a comprises a supplementary braking member 12, a thrust rod 13, and a sleeve 18. An inner end of the thrust rod 13 and the supplementary braking member 12 are provided within the sleeve 18. The outer end of the thrust rod 13 is hinge-connected with one brake arm 10 in the brake unit 9. The connection end of the sleeve 18 (i.e., the right end) is hinge-connected with the other brake arm 10 in the brake unit 9, that is, the outer end of the thrust rod 13 is hinge-connected with the one brake arm 10 in the brake unit. The sleeve 18 has a connection end connected with the other brake arm 10. The supplementary braking mechanism 11a further comprises an electromagnetic device 14 for storing/releasing energy to/from the supplementary braking member 12. The electromagnetic device 14 comprises an electromagnetic coil and an attraction block 17. The electromagnetic coil of the electromagnetic device 14 is connected with the sleeve 18. The supplementary braking member 12 is a spring member. The inner end of the thrust rod 13 passes through the spring-type supplementary braking member 12 and the electromagnetic device 14. The thrust rod 13 is provided on the inner end thereof with a slide block 23 slidable along the thrust rod 13. The spring-type supplementary braking member 12 is provided between an end cover 24 of the sleeve 18 and the slide block 23 with the two ends thereof acting on the sleeve 18 and the slide block 23, respectively. The thrust rod 13 is provided at an inner end thereof with a limit block 19 for the attraction block 17. The attraction block 17 of the electromagnetic device is located between the electromagnetic coil and the limit block 19. The limit block 19 is connected with the thrust rod 13 by means of screw thread connection. The force parameter of the spring-type supplementary braking member 12 can be adjusted by adjusting the relative position of the limit block 19 with respect to the thrust rod 13. A tube sleeve 20 extends from the attraction block 17. The spring-type supplementary braking member 12 acts on the attraction block 17 via the slide block 23 and the tube sleeve 20.

The connection end (i.e., the lower end) of the thruster 1 is connected with a base frame or other fixation members. That is, the thruster 1 has a connection end connected with the base frame or the other fixation members. Such a connection structure is a horizontal structure.

It should be emphasized that in the implementing structure shown in FIG. 13, the brake mechanism 16 in the brake unit 9 is provided outside the brake arm, an outer end of a brake force rod 35 of the brake mechanism 16 is connected with the drive arm 8, and the connection end of the brake mechanism 16 is connected with a base frame or other fixation members.

Figure 14:
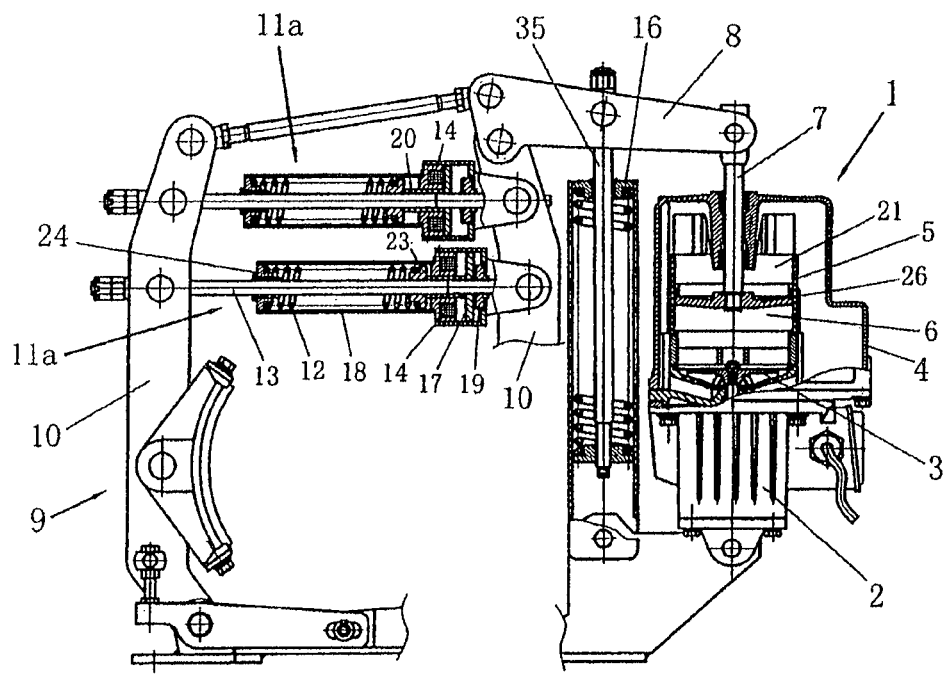
FIG. 14 is a modification of the structure shown in FIG. 13, in which an additional first supplementary braking mechanism is added into the brake unit, i.e., a two-stage first supplementary braking mechanism is provided.

FIG. 14 is a modification of the structure shown in FIG. 13 which is formed by adding an additional supplementary braking mechanism 11a into the brake unit 9 based on the structure shown in FIG. 13, so that a two-stage supplementary braking mechanism 11a is formed. The structure of the additional supplementary braking mechanism 11a is same as described above. Thus, the object to be brake can be supplementarily braked twice.

Figure 15:
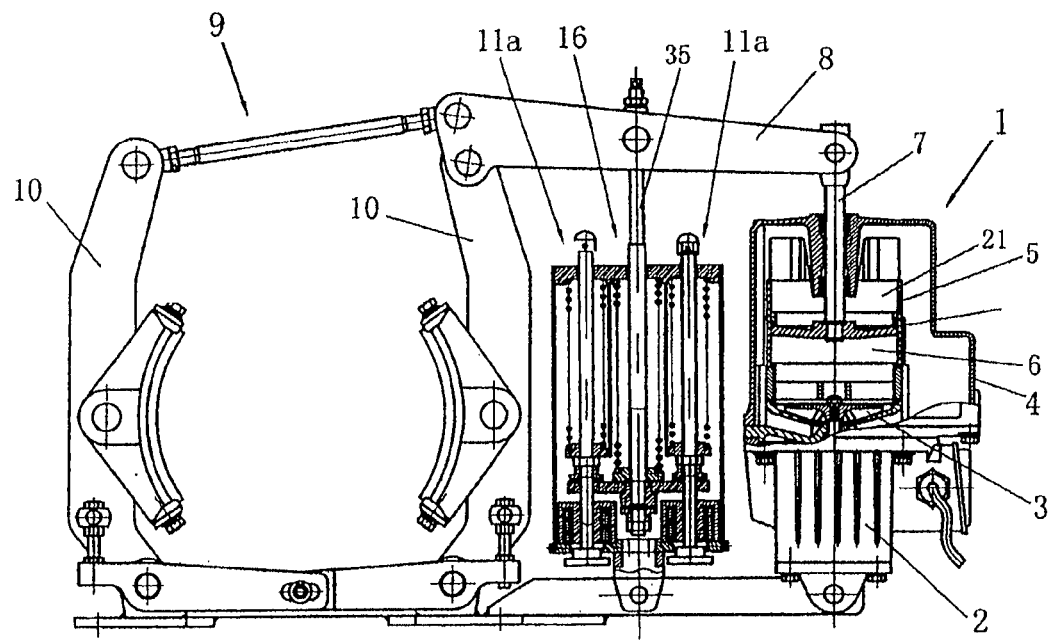
FIG. 15 is a schematic view of the seventh modified structure according to this invention, in which the brake mechanism of the brake unit and the supplementary braking mechanism are integrally formed and are provided outside the brake arm, the seventh modified structure being in a horizontal structure.
Figure 16:
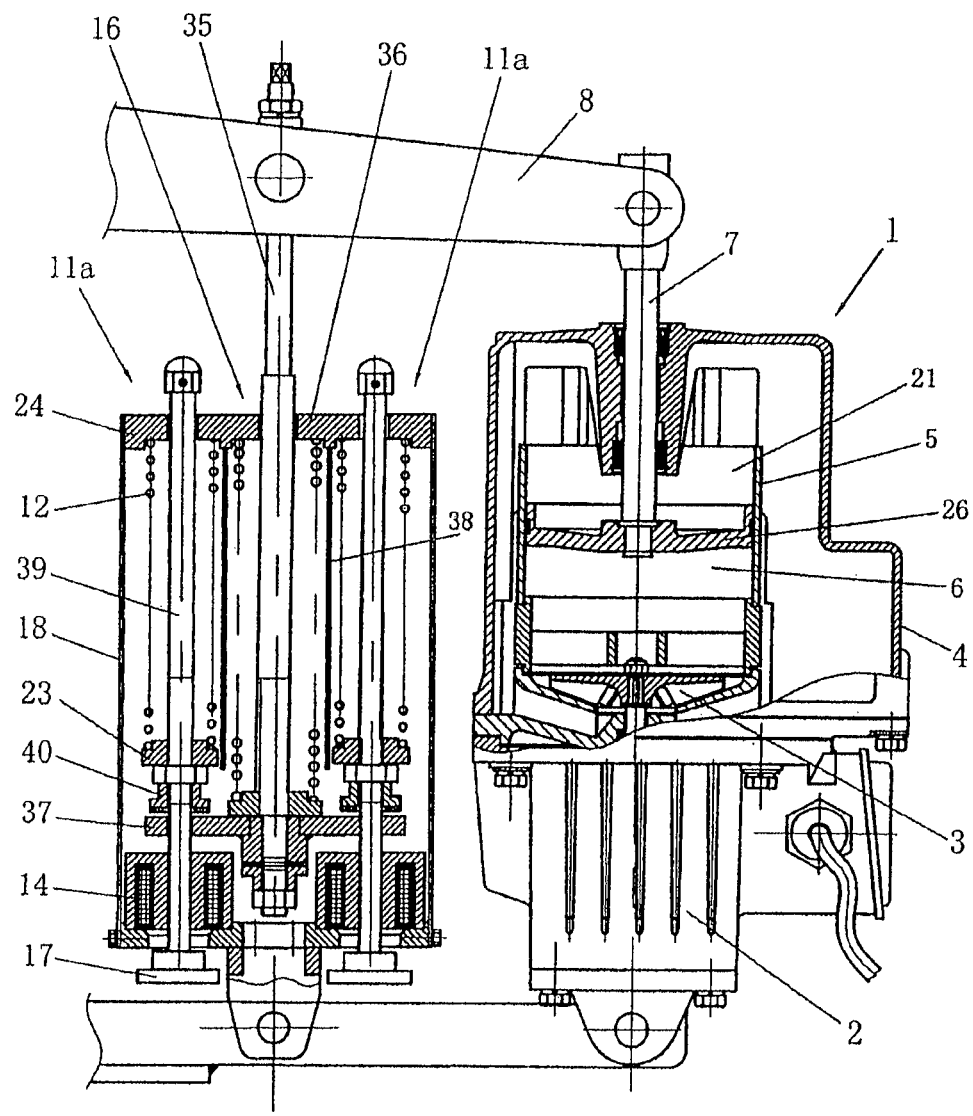
FIG. 16 is an enlarged view of the supplementary braking thrust apparatus in FIG. 15.

FIG. 15 is a seventh modification of the present invention. FIG. 16 is an enlarged view of the structure of the supplementary braking thrust apparatus, in which the brake mechanism 16 of the brake unit and the supplementary braking mechanism 11 are integrally formed and are provided outside the brake arm 10.

This implementing structure comprises a thruster 1. The thruster comprises a drive device 2, a liquid pump 3 driven by the drive device 2, a liquid accumulator 4, and a hydraulic cylinder 5. The inlet of the liquid pump 3 is communicated with the liquid accumulator 4. The outlet of the liquid pump 3 is communicated with a drive liquid cavity 6 of the hydraulic cylinder. A non-drive liquid cavity 21 of the hydraulic cylinder 5 is communicated with the liquid accumulator 4. A piston lever of the hydraulic cylinder, i.e., the push lever 7, is hinge-connected with the drive arm 8 and acts on the brake arm 10 in the brake unit 9 via the drive arm 8. A supplementary braking mechanism for enabling the brake unit to realize the supplementary braking is provided.

An outer end of a brake force rod 35 of the brake mechanism 16 in the brake unit is hinge-connected with the drive arm 8. As show in the figure, the outer end of the brake force rod 35 of the brake mechanism 16 in the brake unit is hinge-connected with the middle portion of the drive arm 8 and acts on the brake arm 10 via the drive arm 8. The inner end of the brake force rod 35 is disposed within a barrel 36 for the brake force rod 35. The lower portion of the inner end of the brake force rod 35 is connected to a drive member 37 which can follow the brake force rod 35 to be moved.

The supplementary braking mechanism of this embodiment is configured to be the supplementary braking mechanism 11a. There is provided two supplementary braking mechanisms 11a. The two supplementary braking mechanisms are provided at the two sides of the brake mechanism 16, respectively. The upper portion of each of the supplementary braking mechanisms is separated from the brake mechanism 16 by a partition plate 38, and the lower portion of each of the supplementary braking mechanisms is communicated with the lower portion of the brake mechanism. The two ends of the drive member 37 provided at the lower portion of the brake force rod 35 extend into the two supplementary braking mechanism, respectively.

The supplementary braking mechanism 11a comprises a supplementary braking member 12, a guide rod 39, and a sleeve 18. The inner end of the guide rod 39 and the supplementary braking member 12 are located within the sleeve 18. The upper end of the guide rod 39 extends out of the end cover 24 of the sleeve 18 and can be moved up and down.

The supplementary braking mechanism 11a further comprises an electromagnetic device 14 for storing/releasing energy to/from the supplementary braking member 12. The electromagnetic device 14 comprises an electromagnetic coil and an attraction block 17. The electromagnetic coil of the electromagnetic device 14 is connected with the sleeve 18. The supplementary braking member 12 is a spring member. The inner end of the guide rod 39 passes through the spring-type supplementary braking member 12, the drive member 37 and the electromagnetic device 14. The guide rod 39 is provided on the inner end thereof with a slide block 23 slidable along the guide rod 39. The spring-type supplementary braking member 12 is provided between the end cover 24 of the sleeve 18 and the slide block 23 with the two ends thereof acting on the sleeve 18 and the slide block 23, respectively. The brake force of the spring-type supplementary braking member 12 acts on the brake arm 10 by means of force transmission action of the drive member 37, the brake force rod 35 and the drive arm 8. The attraction block 17 of the electromagnetic device is connected to the lower end of the guide rod 39 and is adjacent to the electromagnetic coil. The attraction block 17 cooperates with the electromagnetic coil and follows the guide rod 39 to be moved. Further, the slide block 23 is provided on the lower portion thereof with an adjusting member 40. The adjusting member 40 is connected with the guide rod 39 by means of screw thread connection. The force parameter of the spring-type supplementary braking member 12 can be adjusted by adjusting the relative position of the adjusting member 40 with respect to the guide rod 19.

The connection end (i.e., the lower end) of the thruster 1 and the connection end (i.e., the lower end) of the barrel 36 of the brake mechanism 16 are connected with a base frame or other fixation members. That is, the thruster 1 and the barrel 36 in the brake mechanism 16 have connection ends connected with the base frame or the other fixation members. Such a connection structure is a horizontal structure.

Figure 17:
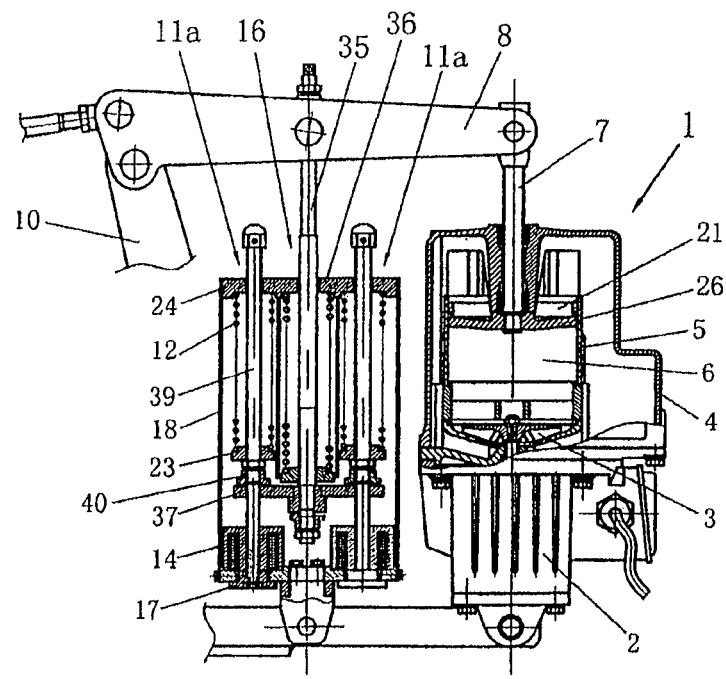
FIG. 17 shows an operating state of the structure shown in FIG. 15 and FIG. 16, in which the normally closed braking of the brake unit and the supplementary braking of this invention are released and the object to be braked is in operating state.
Figure 18:
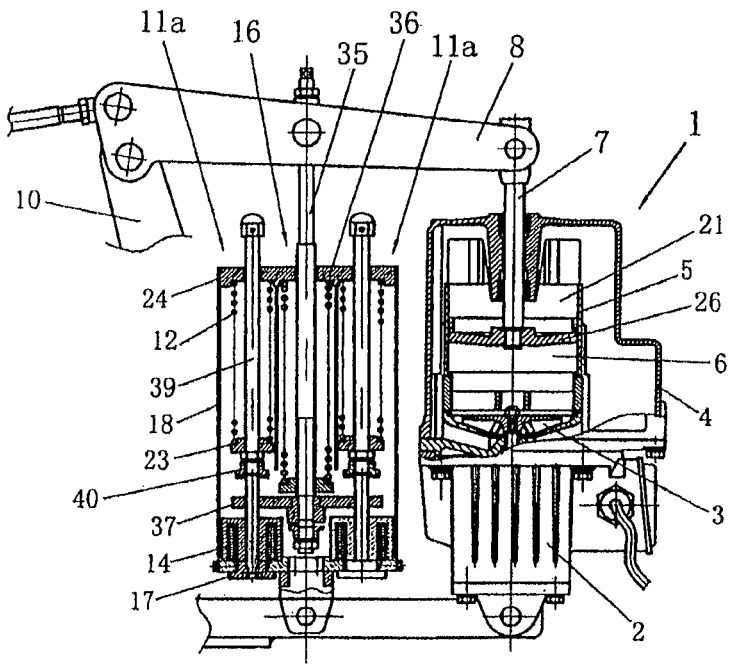
FIG. 18 shows another operating state of the structure shown in FIG. 15 and FIG. 16, in which the brake member of the brake unit is reset to be in normally closed braking and the supplementary braking mechanism of this invention is in energy storing and non-braking state.

The operation of the implementing structure is described as follows. The drive device 2 is operated to drive the liquid pump 3. The pressured liquid enters into the drive liquid cavity 6 of the hydraulic cylinder 5. The piston lever (i.e., the push lever) 7 extends out to the predetermined position. The drive arm 8 is rotated along the anticlockwise direction about the connection point with the brake arm 10. As the drive arm 8 swings upwardly, the brake force rod 35 in the brake mechanism 16 extends outwardly to act on the brake arm 10 in the brake unit 9 against the brake force of the brake mechanism 16 in the brake unit 9. At this time, the brake force rod 35 in the brake mechanism 16 extends outwardly, and then the drive member 37 of the brake force rod 35 drives the guide rod 39 via the adjusting member 40 to be moved upwardly, so that against the force of the spring-type supplementary braking member 12, the spring-type supplementary braking member 12 is brought into a compressed energy-storing state, that is, the supplementary braking and the normally closed braking of the brake are released. The two brake arms 10 are outwardly opened and are retained to be positioned. The object to be braked is in an operating state. At this time, as the guide rod 39 is moved upwardly, the attraction block 17 engages with the electromagnetic coil, as shown in FIG. 17. When braking is needed, the power supply of the drive device is shut off, the operation of the liquid pump 3 is stopped, and the liquid in the drive liquid cavity 6 of the hydraulic cylinder is in a non-pressured state. At this time, due to the brake force of the normally closed braking mechanism 16 of the brake, the drive arm 8 swings downwardly along the clockwise direction about the connection point with the brake arm 10, and the push lever 7 of the brake and the brake force rod 35 of the brake mechanism 16 retract, as shown in FIG. 18. The brake mechanism 16 is restored to be in a normally closed braking state. After the brake is reset to be in normally closed braking, the electromagnetic device 14 is energized, and the attraction block 17 still is in an attraction state. Thus, the guide rod 39 is retained to be positioned, so that the spring-type supplementary braking member 12 is retained in an energy storing state. When supplementary braking is needed, the power supply of the electromagnetic device 14 is shut off. The spring-type supplementary braking member 12 releases energy, so that the guide rod 39 and then the attraction block 17 are moved downwardly. During downward movement of the guide rod 39, when the adjusting member 40 contacts with the drive member 37, the brake force of the spring-type supplementary braking member 12 acts on the drive member 37. Then, the drive member 37 drives the brake force rod 35 to create the second retraction to pull the drive arm 8 downwardly. The drive arm 8 acts on the brake arm 10 again, so that the brake arm 10 retracts inwardly or tends to retracting inwardly. In this way, the supplementary braking of the object to be braked is obtained.

Figure 19:
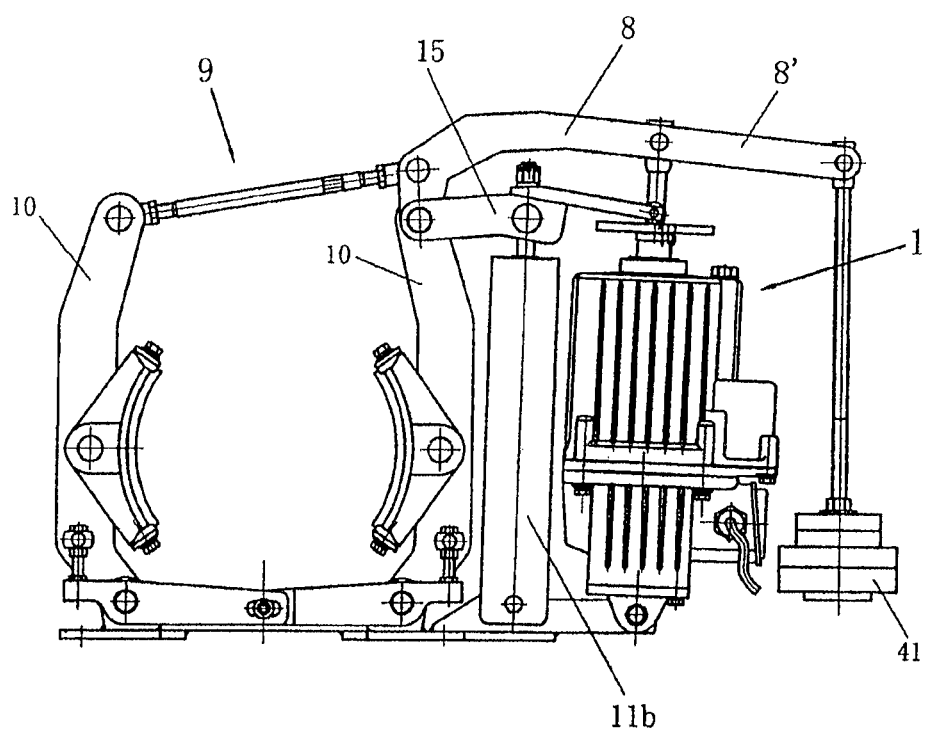
FIG. 19 is a modification of the brake mechanism in the brake unit of the brake.

FIG. 19 is a modification of the brake mechanism 16 in the brake unit of the brake, in which the spring-type brake mechanism 16 in the brake unit is modified into a weight-block type structure. As shown in the figure, the weight-block type brake mechanism 16 comprises a brake block 41. The brake block 41 is connected to an extension lever arm 8' of the drive arm 8. The figure shows a normally closed state. The brake block 41 acts on the brake arm 10 via the extension lever arm 8' and the brake arm 8. When the liquid pump is operated, the push lever 7 of the thruster extends to a predetermined position, and the brake block 41 is lifted. Thus, the two brake arms 10 are opened, and the supplementary braking and the normally closed braking of the brake mechanism 16 are released. When the operation of the liquid pump is stopped, the brake block 41 falls. The push lever 7 creates a first retraction, that is, the normally closed braking is restored. During the supplementary braking, the push lever 7 is retracted again. Thus, the supplementary braking is obtained.

The drive device of the thruster 1 in this invention may be various types of drive device. As shown in the figures, the drive device is a motor. The liquid pump 3 is a centrifugal pump. A plunger pump in which an electromagnet 2 and a liquid pump are integrally formed, may be used.

This description describes several modifications of the supplementary braking thrust apparatus of this invention. Besides, other various modifications are also possible. It is appreciated that any modification based on this invention falls within the scope of this invention.

This invention is also directed to a supplementary braking method of a brake. The brake comprises a brake arm, a thruster and a supplementary braking mechanism. The method comprises the following steps: applying a braking action to the brake arm using the thruster; and applying a further braking action to the brake arm using the supplementary braking mechanism to obtain supplementary braking of the brake.

While the above-mentioned embodiments demonstrate the brake with reference to the shoe-type brake, this invention can be also applied to the disc-type brake.

What is claimed is:

1. A supplementary braking thrust apparatus for a brake, comprising a thruster, a push lever of the thruster acting on a brake arm in a brake unit,
    characterized in that,
    the supplementary braking thrust apparatus of said brake further comprises a supplementary braking mechanism, and the supplementary braking mechanism acts on the brake arm to realize supplementary braking;
    said supplementary braking mechanism comprising a supplementary braking rod and a supplementary braking member, wherein said supplementary braking member releases energy stored therein, and said supplementary braking rod exerts a force on the brake arm to realize supplementary braking;
    said supplementary braking rod is a telescopic thrust rod which exerts said force on the brake arm to realize supplementary braking when said supplementary braking member releases energy; and
    said supplementary braking mechanism is a first supplementary braking mechanism, said first supplementary braking mechanism further comprising:
        a sleeve, an inner end of the thrust rod and the supplementary braking member being provided within the sleeve, the thrust rod being hinge-connected with a thrust arm via the outer end of the thrust rod to act on the brake arm in the brake unit, and the supplementary braking member being a spring member; and
        an electromagnetic device for storing or releasing energy to or from the supplementary braking member, the electromagnetic device comprising an electromagnetic coil and an attraction block, the electromagnetic coil of the electromagnetic device being connected with the sleeve, the inner end of the thrust rod passing through the spring-type supplementary braking member and the electromagnetic device, the thrust rod being provided on the inner end thereof with a slide block slidable along the thrust rod, the supplementary braking member being provided between an end cover of the sleeve and the slide block with the two ends thereof acting on the sleeve and the slide block, respectively, the thrust rod being provided at the inner end thereof with a limit block for the attraction block, the attraction block of the electromagnetic device being located between the electromagnetic coil and the limit block, a tube sleeve extending on the attraction block, the supplementary braking member acting on the attraction block via the slide block and the tube sleeve.

2. The supplementary braking thrust apparatus according to claim 1, characterized in that,
    said thruster and the sleeve in the supplementary braking mechanism have connection ends connected with an extension arm of the other brake arm in the brake unit.

3. The supplementary braking thrust apparatus according to claim 2, characterized in that, said limit block is connected with the thrust rod by means of screw thread connection.

4. The supplementary braking thrust apparatus according to claim 2, characterized in that, said supplementary braking mechanism includes two stages of braking mechanism.

5. A method of operating the supplementary braking thrust apparatus as set forth in claim 1, the method comprising the following steps:
    applying a braking action to the brake arm using the thruster; and
    applying a further braking action to the brake arm using the supplementary braking mechanism to obtain supplementary braking of the brake.

* * * * *